(12) United States Patent
Chisholm

(10) Patent No.: US 9,782,796 B2
(45) Date of Patent: Oct. 10, 2017

(54) SELECTIVE COLOR STRIKING OF COLOR-STRIKABLE ARTICLES

(71) Applicant: Owens-Brockway Glass Container Inc., Perrysburg, OH (US)

(72) Inventor: Brian J. Chisholm, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 194 days.

(21) Appl. No.: 13/954,422

(22) Filed: Jul. 30, 2013

(65) Prior Publication Data

US 2015/0037503 A1    Feb. 5, 2015

(51) Int. Cl.
| | |
|---|---|
| *C03C 23/00* | (2006.01) |
| *B05D 7/00* | (2006.01) |
| *B05C 13/02* | (2006.01) |
| *B05C 21/00* | (2006.01) |
| *C03C 1/10* | (2006.01) |
| *C03C 4/02* | (2006.01) |

(52) U.S. Cl.
CPC ............... *B05D 7/00* (2013.01); *B05C 13/02* (2013.01); *B05C 21/005* (2013.01); *C03C 1/105* (2013.01); *C03C 4/02* (2013.01); *C03C 23/007* (2013.01)

(58) Field of Classification Search
CPC ..... C03C 23/007; C03C 23/001; B44C 1/005; B44C 7/00; B05C 21/005; B05C 13/02; B05C 13/025
See application file for complete search history.

(56) References Cited

U.S. PATENT DOCUMENTS

| | | | | |
|---|---|---|---|---|
| 2,285,181 | A | * | 6/1942 | Wines ............................ 65/323 |
| 2,653,419 | A | | 9/1953 | Brenner et al. |
| 2,682,423 | A | | 3/1954 | Lobdell et al. |
| 2,922,720 | A | | 1/1960 | Parks |
| 3,513,003 | A | | 5/1970 | Hammer et al. |
| 3,627,548 | A | | 12/1971 | Hammer et al. |
| 3,657,085 | A | * | 4/1972 | Hoffmeister ........... B41M 5/262 204/157.41 |
| 3,685,740 | A | | 8/1972 | Shepherd |
| 3,775,154 | A | | 11/1973 | Grego et al. |
| 3,837,831 | A | | 9/1974 | Moore |
| 3,929,535 | A | * | 12/1975 | Ward ....................... B44F 1/10 156/308.2 |
| 4,312,953 | A | | 1/1982 | Mills et al. |

(Continued)

FOREIGN PATENT DOCUMENTS

GB        1065732        4/1967

OTHER PUBLICATIONS

Machine translation of DE 10 2013 103 776; Bernd et al.; Volume colored monolithic glass-ceramic cooking surface for use in glass ceramic cook top, one region whose integral light transmission in visible spectral range is greater than integral light transmission of other region; Jun. 18, 2014.*

(Continued)

*Primary Examiner* — Queenie Dehghan

(57) ABSTRACT

An apparatus for and method of color-striking a color-strikable article. The method includes the steps of: conveying a color-strikable article within a proximity of an energizer, and selectively color-striking said article with said energizer to produce a predetermined pattern on the article.

18 Claims, 2 Drawing Sheets

(56) References Cited

U.S. PATENT DOCUMENTS

| | | | |
|---|---|---|---|
| 4,323,317 A * | 4/1982 | Hasegawa | B41J 2/45 101/35 |
| 4,329,400 A | 5/1982 | Ference et al. | |
| 4,433,621 A | 2/1984 | Van Wyk et al. | |
| 4,769,310 A | 9/1988 | Gugger et al. | |
| 4,854,957 A | 8/1989 | Borrelli et al. | |
| 4,861,620 A * | 8/1989 | Azuma | B41M 5/28 347/232 |
| 4,912,298 A | 3/1990 | Daniels et al. | |
| 5,206,496 A | 4/1993 | Clement et al. | |
| 5,316,897 A * | 5/1994 | Shafir | 430/397 |
| 5,653,900 A * | 8/1997 | Clement | B23K 26/0838 219/121.68 |
| 6,158,246 A | 12/2000 | Borrelli et al. | |
| 6,238,847 B1 | 5/2001 | Axtell, III et al. | |
| 6,503,310 B1 | 1/2003 | Sullivan | |
| 6,503,316 B1 | 1/2003 | Sakoske et al. | |
| 6,638,440 B1 * | 10/2003 | Grimard | B41J 2/442 216/31 |
| 6,680,121 B2 | 1/2004 | Sakoske et al. | |
| 6,776,340 B2 * | 8/2004 | Murokh | B41J 2/17566 235/380 |
| 7,265,069 B2 | 9/2007 | Sakoske et al. | |
| 7,737,062 B2 | 6/2010 | Sakoske et al. | |
| 8,997,522 B2 * | 4/2015 | Click et al. | 65/30.11 |
| 2004/0118157 A1 | 6/2004 | Borek et al. | |
| 2007/0160948 A1 * | 7/2007 | Gartz | C21D 1/52 432/146 |
| 2009/0133442 A1 * | 5/2009 | Bretschneider | C03B 33/09 65/113 |
| 2012/0210750 A1 * | 8/2012 | Cooper | C03C 27/06 65/43 |
| 2013/0341228 A1 * | 12/2013 | Click | C03C 23/0005 206/459.5 |
| 2014/0305929 A1 * | 10/2014 | Weiss | B41M 5/262 219/460.1 |

OTHER PUBLICATIONS

PCT Search Report and Written Opinion, Int. Serial No: PCT/US2014/043799, Int. Filing Date: Jun. 24, 2014, Applicant: Owens-Brockway Glass Container Inc., Mail Date: Sep. 16, 2014.

* cited by examiner

SELECTIVE COLOR STRIKING OF COLOR-STRIKABLE ARTICLES

The present disclosure is directed to manufacturing color-strikable articles and, more specifically, to color striking color-sinkable articles.

BACKGROUND AND SUMMARY OF THE DISCLOSURE

Glass may be heated for a variety of purposes. For example, in some instances, heating a glass article may alter its color. U.S. Pat. No. 3,627,548 discloses a process for making a dark amber glass article. The process includes a step of adding a sufficient amount of copper oxide to an amber base glass containing iron and sulfur as the amber color-producing ingredients, and a step of reacting the copper with the sulfur in the amber base glass at an elevated temperature and for a period of time to thereby produce a dark coloration in the glass. The patent further discloses various characteristics of the ingredients and other materials.

A general object of the present disclosure, in accordance with one aspect of the disclosure, is to provide an apparatus for selectively striking color patterns in glass, composites, and ceramics.

The present disclosure embodies a number of aspects that can be implemented separately from or in combination with each other.

In accordance with one aspect of the disclosure, there is provided an apparatus for striking color in color-sinkable articles which includes a conveyor for presenting the articles in sequence, and an energizer positioned adjacent to the conveyor for direct selective energizing of the articles to strike at least one color therein as the articles are presented by the conveyor.

In accordance with another aspect of the disclosure, there is provided a method of color-striking a color-strikable article that includes the steps of conveying a color-strikable article within a proximity of an energizer, and selectively color-striking the article with the energizer to produce a predetermined pattern on the article.

In accordance with another aspect of the disclosure, there is provided a method of color-striking a color-strikable article that includes the steps of conveying a color-strikable article within a proximity of a heater having at least one gas flame port, and selectively color-striking the article with the heater to produce a predetermined, pattern on the article, wherein the heater is not located in a lehr.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figure 1:
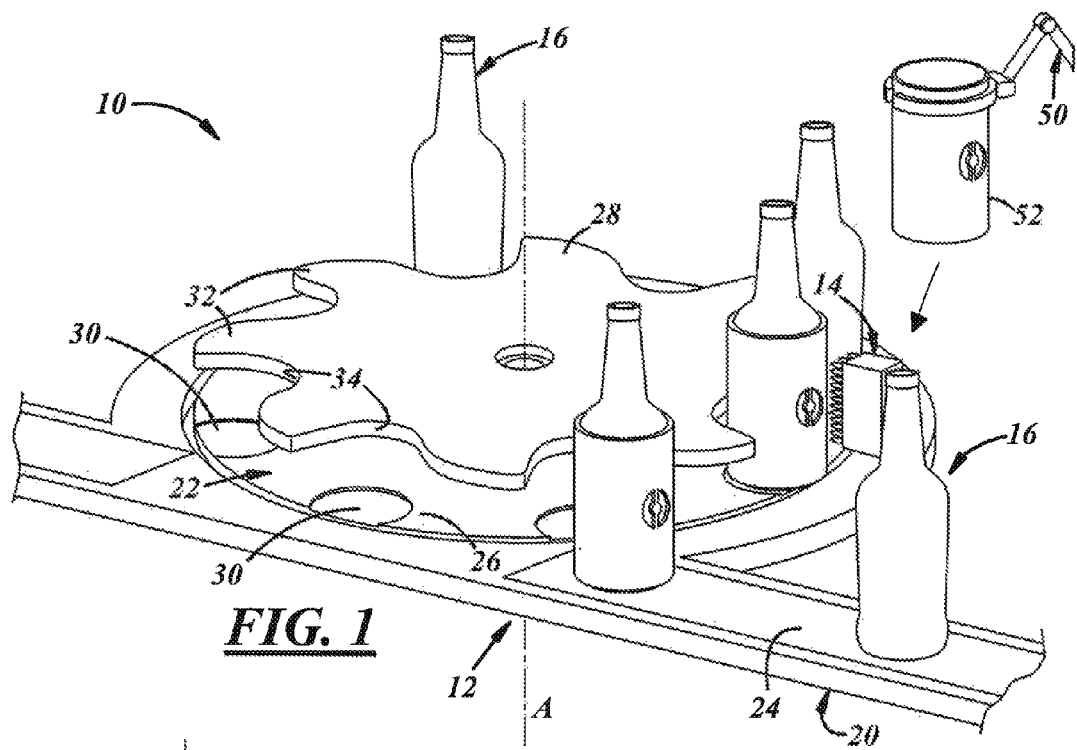
FIG. 1 is schematic diagram of an energizing system including a conveyor and an energizer for color-strikable articles in accordance with an illustrative embodiment of the present disclosure.

The present disclosure relates to color-striking a color-strikable article 16 (e.g., composed of glass, composite, and/or ceramic material). An energizer 14 may be positioned adjacent to a conveyor or conveyor assembly 12 for selectively striking color in, for example, articles 16, as they are conveyed sequentially in proximity of the energizer 14. In one implementation, a mask 52 may be used to direct or localize energy onto each article 16. And in at least one implementation, the articles 16 may be produced in accordance with illustrative embodiments of a glass manufacturing process disclosed herein below.

Figure 2:
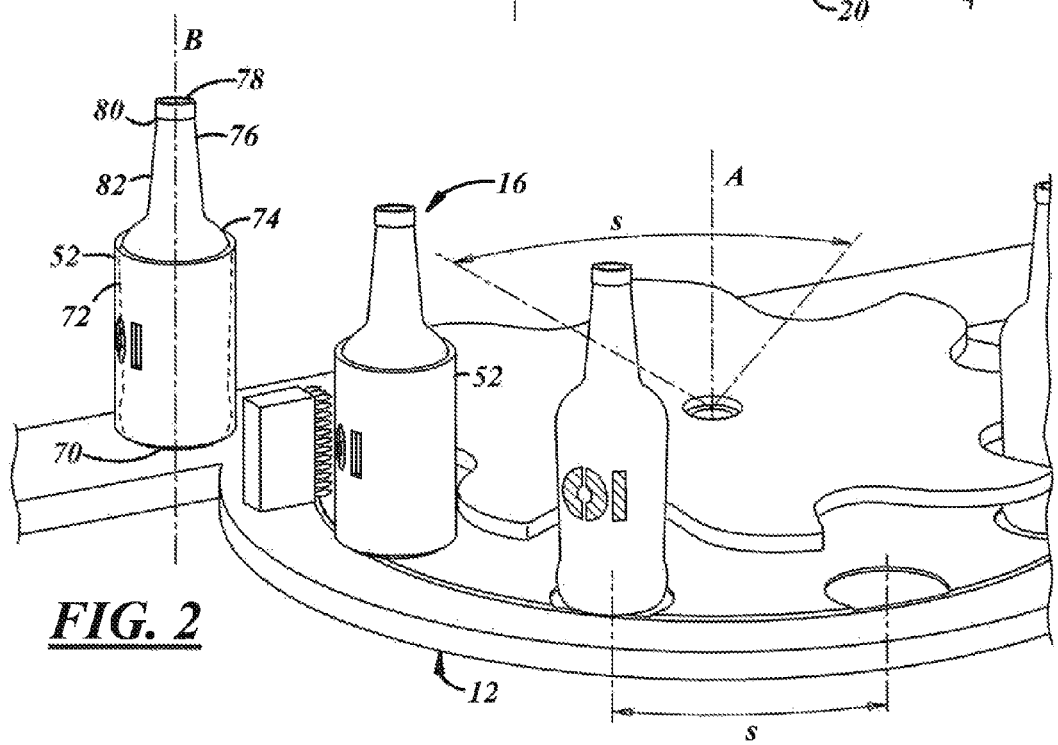
FIG. 2 is another view of the schematic diagram of FIG. 1 including a masking locator.

In FIGS. 1 and 2, an illustrative embodiment of an apparatus or system 10 is shown. The system 10 may treat any article composed of any material; for the purposes of illustration, color-sinkable articles 16 are shown. The system 10 includes the conveyor 12 and the energizer 14.

The conveyor 12 may be any mechanism for conveying or moving multiple articles 16. Those having ordinary skill in the art will appreciate the various conveyor parts and components which may be used, as well as the various manner of their use and application; FIG. 1 illustrates merely one implementation. The conveyor 12 shown includes a first conveyor portion 20 in communication with a second (rotary) conveyor portion or turret 22. FIG. 1 shows a generally linear portion of the first conveyor portion 20 having a conveying surface 24 and the second conveyor portion 22 is illustrated as generally circular. The second conveyor portion 22 may be configured to receive articles 16 from the first conveyor portion 20, perform a color striking operation, and then redeliver or discharge the articles 16 to the first conveyor portion 20.

The second conveyor portion 22 may include a rotatable lower member 26 axially spaced below a rotatable star wheel 28 e.g., along an axis A. The periphery of the lower member 26 may have multiple article staging platforms or footprints 30 spaced from one another at an arcuate distance S. In the illustrated implementation, eight platforms 30 are shown. In some implementations, the staging platforms 30 may be independently rotatable. The staging platforms 30 may be generally coplanar with the conveying surface 24 of the first conveyor portion 20 to enable a smooth conveyance of the articles 16 between the first and second conveyor portions 20, 22. The circumference of the star wheel 28 may include an alternating series of radially outwardly extending flanges 32 and radially inwardly extending notches 34, each notch being spaced at an approximate arcuate distance S. In the illustrated implementation of FIGS. 1 and 2, eight flanges 32 and eight notches 34 are shown. Further, the eight illustrated staging platforms 30 of the lower member 26 are oriented to angularly coincide with the eight circumferentially located notches 34 so that each notch may cradle one of the articles 16 as they are carried by the corresponding platform 30, as will be explained in greater detail below.

Figure 3:
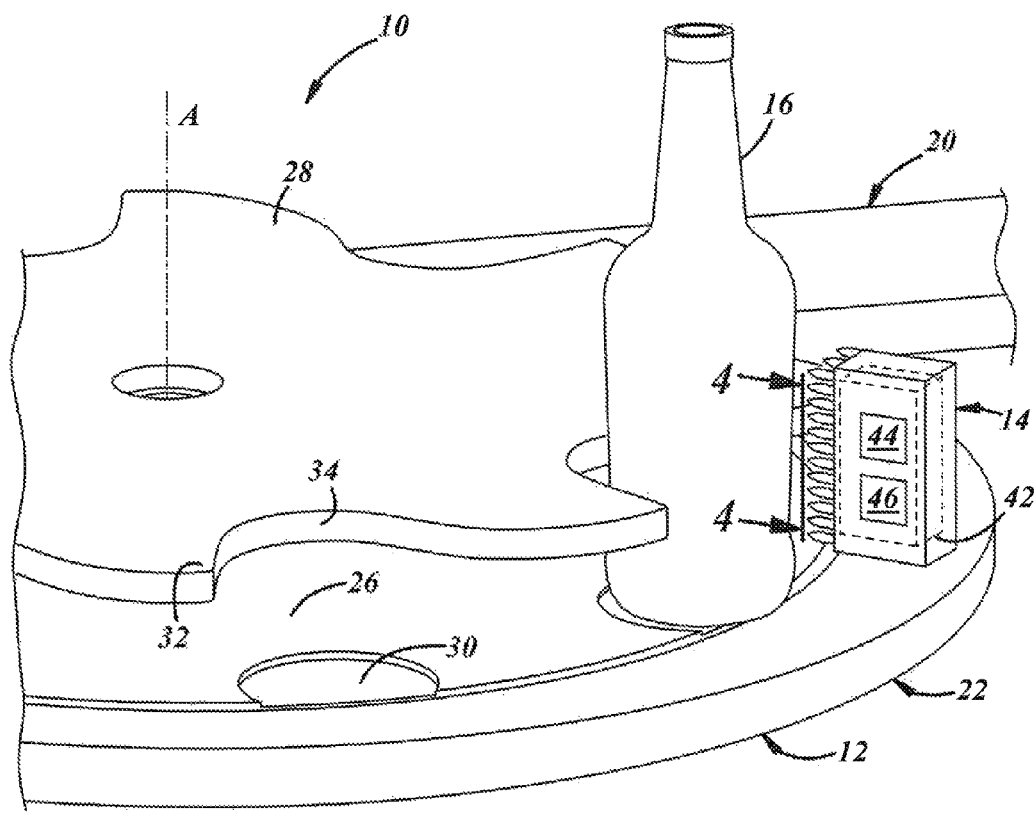
FIG. 3 is a sectional view of the schematic diagrams of FIGS. 1 and 2.
Figure 4:
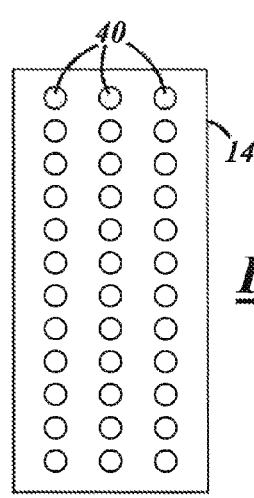
FIG. 4 is a front view of the energizer of FIG. 3.

The energizer 14 may be located at any desirable location adjacent to the conveyor 12 (see also FIG. 3), in some implementations, the energizer 14 may be coupled to or integrated with the conveyor 12. As shown in FIGS. 1-3, the energizer 14 is located adjacent to the second conveyor portion 22. The term energizer 14 should be construed broadly and may include any suitable energy emitting or transferring device (e.g., to a glass, composite, and/or ceramic article). Examples of energy transfer include, but are not limited to radiant or electro-magnetic energy transfer, conductive energy, electrical energy, chemical energy, etc.

and in at least some examples, may be manifested in the form of heat or heat transfer. For example, the illustrated energizer 14 is a gas flame burner (e.g., an oxy-propane burner); however, other embodiments are possible (e.g., infrared (IR) heaters, suitable lasers, ultraviolet light elements, etc.). The energizer 14 may have multiple energy-emitting locations, for instance, energizer ports 40 (FIG. 4). In at least one implementation, the multiple ports 40 are arranged in a two-dimensional array of columns and rows (e.g., 3 vertically-oriented columns and 12 horizontally-oriented rows). The array is merely one example; it will be appreciated that many arrangements are possible, and the ports 40 may have varying spatial and/or angular orientations. For example, the array may or may not be planar. In one implementation, the ports 40 are each angularly oriented towards the axis A. In another implementation, the ports are arranged or arrangeable in accordance with a shape or a pattern including logos, emblems, text, etc. in yet another implementation, the energizer 14 may include a ribbon burner. The energizer 14 may be both mechanically and electrically coupled to other devices and/or components. For example, it may be mechanically coupled to a fuel supply line (not shown). The energizer 14 also may be electrically coupled to power and/or control circuitry 42 (which may include a processor 44 and memory or non-transitory computer-readable medium 46). The circuitry 42 (and the processor 44 where applicable) may be configured to enable independent control of the ports 40. For example, the processor 44 may be programmable (e.g., according to a set of instructions or a program stored on the memory 46).

The energizer 14 may be configured to output varying amounts of heat. For example, in some embodiments, the energizer 14 may provide localized heat reaching temperatures of 720° C. at the surface of the articles 16. When the energizer 14 is used for color-striking, temperatures at the surface of the articles 16 may be between 550-720° C.; although temperatures higher and lower than this range may still be utilized.

The apparatus 10 may also include a masking locator 50 to position the mask 52 so as to direct or localize energy onto predetermined regions of the articles. The mask 52 may be provided with or without an open region 54. The mask 52 may include any thermal barrier or structure to inhibit or impair the energizer 14 from raising the temperature of the articles 16 (e.g., a barrier to the flames from a gas flame burner) in regions other than the open region 54. The mask 52 may be made of any suitable material that inhibits the energizing of the article in the vicinity of the mask 52. Examples of suitable material include ceramics, titanium or titanium alloys, refractory material(s), insulating material(s) (e.g., an insulating cloth), etc. In addition, the mask 52 may also be actively cooled; e.g., being coupled to a thermal ground or heat sink, or circulating a fluid that is relatively cold through hollow portions (not shown) of the mask 52 to dissipate any undesired heat.

The open region 54 may be used as a energizing-template or stencil—for receiving energy in localized areas that are not otherwise blocked by the remainder of the mask 52. The open region 54 may be construed broadly to include regions within the periphery of the mask 52, outside the periphery, or both. Thus, in at least one embodiment, the open region 54 on the mask 52 may include one or more openings 56a, 56b, 56c within the periphery (an example being illustrated in FIG. 5). The opening(s) may define a pattern; e.g., the pattern may include any indicia, ornamentation, identifier, symbol, brand or logo, text or message (having any suitable font styles), emblem, image, or likeness, other graphic elements, or any combination thereof. The open region 54 may define commercially desirable patterns, and in at least one implementation, the open region 54 may define a trademark, for instance, the "O I" mark shown on the article in FIG. 2. In other embodiments, the one or more openings (e.g., 56a, 56b, 56c, etc.) also may include randomized patterns and/or shapes.

Figure 5:
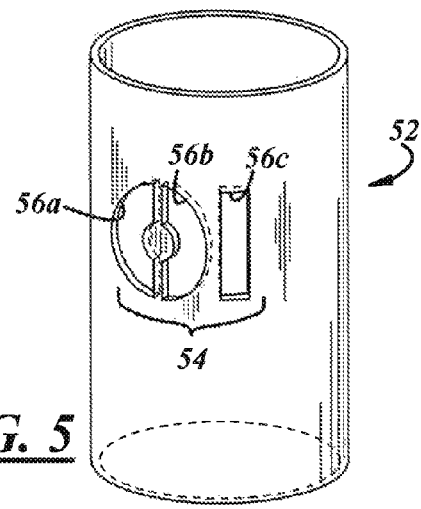
FIG. 5 is a perspective view of a mask for the articles of FIGS. 1, 2, and 3.

The masking locator 50 may be implemented in various ways. For example, the masking locator 50 may include a mechanical or electro-mechanical device (which also may be coupled to the conveyor 12) having a positioning member (not separately shown) with the mask 52 located at a distal end. In this implementation, the positioning member may be configured to locate or position the mask 52 proximate to one of the articles 16 and so that the mask 52 is between the article 16 and the energizer 14. In another embodiment (see FIG. 2), the mask 52 may be detachably coupled to the positioning member. For example, the mask 52 may be a full or partial sleeve and the positioning member may locate or couple the mask over or around the articles 16 by sliding it thereover from above the conveyor 12 (e.g., an at least semi-cylindrical mask as shown in FIG. 5). Of course, the mask 52 does not have to be curved; it could also be flat or angular or some combination of curved, flat, or angular. The locator 50 may include a robot, pick and place machine, or any other suitable material handler. These implementations are merely illustrative, and other implementations will be appreciated by those of ordinary skill in the art. The use of the mask 52 will be described in greater detail below.

In FIGS. 1 and 2, a number of articles 16 are shown on the conveyor 12. The articles 16 includes containers and dishware and may be of any suitable shape, and may include jugs, jars, bottles, other food or beverage containers including bowls, plates, various serving ware, etc. An example of an article 16 may include a base 70 at one axial end upon which the article may be supported, a body 72 extending axially from the base 70, a shoulder 74 extending radially and axially from the body 72, and a neck 76 extending axially from the shoulder 74 to an axial outward end surface 78. As used herein, the term axial includes oriented generally along a longitudinal axis of the closure, article, or package and may include but is not limited to a direction that is strictly parallel to a longitudinal central axis B of an article.

The body 72 and neck 76 may be generally cylindrical, or they may be tapered or of any other suitable shape. The neck 76 may include one or more closure retention elements 80 projecting from an external surface 82, or the like, for cooperation with corresponding portions of a closure (not shown). The element(s) 80 may include threads or thread segments, as illustrated, or bayonet features, snap-fit features, or any other suitable closure retention features. As used herein, the term thread segment includes whole, partial, multiple, and/or an interrupted thread, thread segment, and/or lug. The exterior surface 82 may include all outwardly facing surfaces on the base 70, body 72, shoulder 74, and neck 76 (including element(s) 80 and the end surface 78).

The articles 16 may be of one-piece integrally formed construction and may be made of glass, ceramic, and/or composite construction. (The term "integrally formed construction" does not exclude one-piece integrally molded layered constructions of the type disclosed for example in U.S. Pat. No. 4,740,401, or one-piece bottles to which other structure is added after the bottle-forming operation.) In one embodiment, the articles 16 may be lubricated in press-and-blow or blow-and-blow glass article manufacturing operations.

Manufacturing may include glass, ceramic, and/or composite article production process (e.g., in a lehr) followed by localized energizing process using the illustrative conveyor 12. Both processes are described below.

For example, in glass article production, manufacturing includes a "hot end" and a "cold end." The hot end may include one or more glass melting furnaces (not shown) to produce a glass melt, one or more forming machines (not shown) to form the glass melt into articles 16, and one or more applicators (not shown) to apply a hot-end coating to the articles 16. The "hot end" also may include an annealing lehr (not shown), or at least a beginning portion of the annealing lehr, for annealing the articles 16 therein. Through the lehr, the temperature may be brought down gradually to a downstream portion, cool end, or exit of the lehr. The "cold end" may include an end portion of the annealing lehr, applicators to apply one or more cold-end coatings to the articles 16 downstream of the annealing lehr, inspection equipment to inspect the articles, and packaging machines (not shown) to package the articles.

In conjunction with the above description, the articles 16 may be produced by the following an article manufacturing process, which may or may not include all of the disclosed steps or be sequentially processed or processed in the particular sequence discussed, and the presently disclosed manufacturing process and marking methods encompass any sequencing, overlap, or parallel processing of such steps.

For example, in a glass article manufacturing process, first, a batch of glass forming materials may be melted. For example, a melting furnace may include a tank with melters to melt soda-lime-silica to produce molten glass. Thereafter, the molten glass may flow from the tank, through a throat, and to a refiner at the downstream end of the furnace where the molten glass may be conditioned. From the furnace, the molten glass may be directed toward a downstream forehearth that may include a cooling zone, a conditioning zone, and a downstream end in communication with a gob feeder. The feeder may measure out gobs of glass and deliver them to a glass articles forming operation.

Next, the glass gobs may be formed into articles 16, for example, by forming machines, which may include press-and-blow or blow-and-blow individual section machines, or any other suitable forming equipment. Blank molds may receive the glass gobs from the feeder and form parisons or blanks, which may be at a temperature, for example, on the order of 900-1100° C. Blow molds may receive the blanks from the blank molds and form the blanks into articles 16, which may be at a temperature, for example, on the order of 700-900° C. Material handling equipment may remove the articles 16 from the forming machines and place the articles on conveyors or the like.

Also, the formed articles may be annealed, for example, by an annealing lehr. At an entry, hot end, or upstream portion of the annealing lehr, the temperature therein may be, for instance, on the order of 500-700° C. Through the lehr, the temperature may be brought down gradually to a downstream portion, cool end, or exit of the lehr, to a temperature therein, for example, on the order of 65-130° C.

In some implementations, after the annealing step, the formed articles 16 may be generally or globally color-struck, for instance, while still in the lehr. As used herein, color-striking should be construed to include the application of energy to an article or at least the article's surface, e.g., to the surface of the color-strikable articles 16, such that the transference or conveyance of the energy chemically changes the reflected wavelength(s) of the material (thus, the apparent color is changed). Thus, global color-striking includes changing the color of the entire article 16; e.g., by indirect application of heat, for instance, in a lehr or furnace. Color-striking may be used to alter the previous coloration and/or transparency of the articles 16 for various reasons including adding aesthetic quality, branding, providing ultraviolet (UV) protection, and providing security or anti-counterfeiting features (just to name a few). Depending upon the chemistry employed, a variety of colors may be achieved (e.g., black, red, or any other desirable color).

In some implementations, the color-striking step begins by including special additives in the batch of forming materials. For example, where articles 16 are glass, the special additives may be a mixture of latent colorant materials formulated for use with a plurality of soda-lime silica base glass compositions having reduction-oxidation numbers in the range of −40 to +20. For example, one mixture of latent colorant materials includes cuprous oxide ($Cu_2O$), stannous oxide (SnO), bismuth oxide ($Bi_3O_3$), and carbon (C), as described in U.S. patent application Ser. No. 13/666,629, which is herein incorporated by reference in its entirety. The color-striking process may include reheating the articles 16 according to a predetermined profile and according to a predetermined temperature within the lehr (i.e., a second lehr or the previously described lehr) or within an extension of the previously described lehr. The predetermined temperature(s) may not be hotter than the temperatures used in the article formation steps. This of course is merely one implementation and those having ordinary skill in the art will appreciate other techniques and formulations to color-strike articles 16.

Following the article production process, the articles 16 may receive localized or selective energizing using the apparatus 10 shown in FIGS. 1-3. In some implementations, the localized energizing may color-strike further the color-strikable articles 16 (e.g., green glass can be struck to black, blue glass can be struck to red, and other variations; e.g., under circumstances including the right combination of additives and striking temperatures). And in other implementations, the localized energizing may color-strike the articles 16 for the first time (e.g., where the article 16 has not been subjected to global color-striking). In any event, in contrast to global or general color striking involving indirect application of heat or energy, here the color-strikable articles 16 are energized directly. The selective color-striking may leave a pattern on the articles; as used herein, the term 'on' an article includes in the article as well; i.e., the selective color-striking may alter the color of the surface and/or the thickness of the article material (e.g., the base 70, body 72, shoulder 74, and/or neck 76) in the respective localized area. Similarly, energizing the articles includes energizing the surface and/or the thickness of the article material (e.g., the base 70, body 72, shoulder 74, and/or neck 76) in the respective localized area. Furthermore, the selective color-striking also may be performed for various reasons associated with any global color-striking (e.g., adding aesthetic quality, branding, providing ultraviolet (UV) protection, providing security or anti-counterfeiting features, etc.).

The localized energizing process may include the articles 16 being carried by the conveying surface 24 of the first conveyor portion 20 and delivered or in-fed to the second conveyor portion 22 for presentation to the energizer 14. In one implementation, the articles 16 are received from the cooling end of the lehr by the first conveyor portion 20 (i.e., the localized energizing may not occur within the lehr). Regardless, the articles 16 are spaced at a distance S along the first conveyor portion 20. As the second conveyor portion rotates, the articles 16 may be received onto the staging platforms 30 of the lower member 26 and into the corresponding notches 34 of the star wheel 28. The staging platforms 30 and the notches 34 individually may guide the articles 16 towards the energizer 14. The linear speed of the first conveyor portion 20 may correspond to the angular speed of the second conveyor portion 22 so that the articles 16 are delivered from the first conveyor portion 20 to the second conveyor portion 22 without disturbance or interruption. In addition, as will be discussed below, the speed of the conveyor portions 20, 22 may be one means of controlling the duration of energizing by the energizer 14.

Once the articles 16 are located on one of the staging platforms 30, the rotating second conveyor portion 22 may present the articles 16 to the energizer 14 to receive energy therefrom. In at least one implementation, the energizing may color-strike the article 16. The exposure duration of the energizing may depend at least partially upon the rotational speed of the second conveyor portion 22. Persons of ordinary skill in the art will appreciate that the duration of the applied energy may affect the colors produced during color-striking. Thus, the second conveyor portion 22 may be configured to rotate at a speed to produce the desired color or pattern, e.g., in accordance with the magnitude of the energy received from the energizer 14 and the duration of exposure to the applied energy. In some implementations, the energizer ports 40 of the energizer 14 may actuate ON and/or OFF according to a predetermined scheme or pattern. For example, the rows may sequentially actuate ON from the top to the bottom or vice-versa such that as each row is actuated ON, it remains ON while treating that particular article 16. Such a pattern may color-strike a gradient pattern in the article. In another example, every other row (or every third row, etc.) may actuate ON for each passing article color-striking a horizontally striped or isolated banded pattern. In another implementation, the ports 40 may actuate ON and OFF in a pulsing or pulsating manner to create various image interrupted patterns or control the temperature of the article material (e.g., according to a duty cycle). Those of ordinary skill in the art will appreciate the numerous patterns and schemes that may be achieved by manipulating and controlling the ON and OFF actuation of the multiple energizer ports 40 as each article passes thereby.

In another implementation, the energizer 14 may move relative to the second conveyor portion 22—i.e., it may move axially, radially, and/or circumferentially with respect to axis A to apply energy to each article 16 that passes thereby. For example, the energizer 14 may be configured to move circumferentially at the same or different rate or angular speed of the second conveyor portion 22 applying localized energy to one article, and then move to the next article repeating the configured process. A robot, a machine slide, or any other suitable handling equipment may be used to move the energizer 14.

In another implementation, the staging platforms 30 may rotate. Thus, the second conveyor portion 22 may present the individual articles 16 to the energizer 14 as the articles 16 are rotated according to the rotational speed and direction of the platforms 30. In at least one implementation, the second conveyor portion 22 may rotate according to a stop/go sequence; e.g., the second conveyor portion 22 may rotate thereby locating the articles 16 in proximity to the energizer 14 and then may stop while the staging platform 30 begins to rotate thereby exposing part of or the entire circumference of the article 16 to the energy from the energizer 14 (e.g., to color-strike a banded pattern on the article 16).

The embodiment of FIGS. 1-3 shows both the first conveyor portion. 20 as a linear conveyor and the second conveyor portion 22 as a rotary conveyor; however, this is merely illustrative. The apparatus 10 may include one or more linear conveyors, one or more rotary conveyors, one or more serpentine conveyors, or any combination thereof.

In another implementation, the masking locator 50 may locate the mask 52 between the articles 16 and the applied energy of the energizer 14, and in some cases, the mask 52 may also be adjacent to the article 16. The mask 52 may conform at least partially and generally to the external surface 82 of the article. For example, the mask 52 may have a cylinder-shape (see FIG. 5) and be sized to receive the body 72 of the article 16. For example, the articles 16 may be presented to the energizer 14 via the second conveyor portion 22, the mask 52 may be located therebetween, and the energizer port(s) 40 may be actuated. In other implementations, detachable masks 52 may be located on the articles 16 prior to presentation to the energizers 14 and/or prior to receipt by the first or second conveyor portions 20, 22.

In another implementation, the apparatus 10 may have multiple energizers 14 located near the conveyor 12. In at least one implementation, the multiple energizers 14 may slaved to a single controller 44.

In another implementation, the mask 52 of the apparatus 10 may be fixedly or detachably coupled to the energizer 14 to selectively obstruct one or more ports 40 thereat. Or in another implementation, the mask 52 of the apparatus 10 may be fixedly or detachably coupled to the second conveyor portion 22.

It should be appreciated that the various described implementations are merely illustrative and that the various implementations may be used in combination.

After the localized energizing has been applied to the article 16, the masking locator 50 then may remove the mask 52 from the proximity of the article 16. Lastly, the article may be discharged to the first conveyor 20 portion again.

While the energizing process has been described with respect to a conveyor having first and second conveyor portions 20, 22, other means of conveyance are possible. In addition, the aforedescribed energizing has pertained to color-striking to color-strikable articles. Thus, the localized energizing may be performed for any suitable purpose on containers, dishware, etc. being composed of any suitable material.

In addition, the use of the mask 52 and the programmability of the energizer 14 may provide greater control of the application of energy to the articles 16 and minimize the amount of unused energy (e.g., energy typically associated with use of a lehr).

It should be appreciated that the processor 44 can be any type of device capable of processing electronic instructions including microprocessors, microcontrollers, host processors, controllers, and application specific integrated circuits (ASICs). It can be a dedicated processor used only for the energizer 14 or can be shared with other manufacturing machines. Processor 44 may execute various types of digitally-stored instructions, such as software or firmware programs stored in memory 46. For instance, processor 44 can execute programs or process data to carry out at least a part of the method discussed herein.

There thus has been disclosed methods of manufacturing, heat-treating, and selectively energizing (e.g., color-striking) glass, composite, and/or ceramic articles, that fully satisfy all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the presently disclosed articles and methods have been discussed in terms of a glass article manufacturing process, but the disclosure likewise may apply to other articles and article manufacturing composed of metal, plastic, and other ceramics. The disclosure is intended to embrace all such modifications and variations as fall within the spirit and broad scope of the appended claims.

The invention claimed is:

1. An apparatus for striking color in color-strikable glass or ceramic articles, which includes:
    a conveyor for presenting color-strikable glass or ceramic containers in sequence;
    an energizer positioned adjacent to said conveyor for direct selective energizing of said containers to strike at least one color therein as the containers are presented by the conveyor, wherein a mask is positioned between said energizer and said containers, wherein the mask includes an open region, wherein said open region is defined by a pattern, wherein the pattern includes at least one of an indicia, an ornamentation, an identifier, a symbol, a brand, a logo, text or a message, an emblem, an image, or a likeness, wherein the energizer is a gas-fired burner comprising a plurality of flame ports;
    a controller configured to selectively control the plurality of flame ports; and
    a non-transitory computer-readable medium comprising instructions executable by said controller to provide independent control of one or more flame ports of said plurality of flame ports of said energizer according to a predetermined pattern.

2. The apparatus set forth in claim 1 including a masking locator for positioning the mask between said energizer and said containers.

3. The apparatus set forth in claim 1 wherein, during direct energizing, said mask is located adjacent said container or said energizer.

4. The apparatus set for in claim 1 wherein said conveyor has at least one staging platform for carrying a single container and rotating said container thereon along its longitudinal axis in proximity of said energizer.

5. The apparatus set forth in claim 1 wherein said conveyor includes at least one of a linear conveyor, a rotary conveyor, or a serpentine conveyor.

6. The apparatus set forth in claim 1 wherein the energizer is located outside of a lehr.

7. The apparatus set forth in claim 1 wherein the energizer is adapted to provide localized heat from at least some of the plurality of flame ports to said container at a temperature within a range of 550-720° C.

8. The apparatus set forth in claim 1 wherein the energizer comprises an oxy-propane burner.

9. An apparatus for striking color in color-strikable glass or ceramic articles, which includes:
    a conveyor for presenting color-strikable glass or ceramic containers in sequence;
    an energizer positioned adjacent to said conveyor for direct selective energizing of said containers to strike at least one color therein as the containers are presented by the conveyor, said energizer including a plurality of energy-emitting locations;
    a controller configured to selectively control the plurality of energy emitting locations; and
    a non-transitory computer-readable medium comprising instructions executable by said controller to provide independent control of one or more energy-emitting locations of said plurality of energy-emitting locations of said energizer according to a predetermined pattern including at least one of an indicia, an ornamentation, an identifier, a symbol, a brand, a logo, text or a message, an emblem, an image, or a likeness.

10. The apparatus set forth in claim 9 further including a mask positioned between said energizer and said containers, wherein the mask includes an open region defined by a pattern.

11. The apparatus set forth in claim 10 wherein, during direct energizing, said mask is located adjacent said container or said energizer.

12. The apparatus set forth in claim 10 including a masking locator for positioning the mask between said energizer and said containers.

13. The apparatus set forth in claim 9 wherein said plurality of energy-emitting locations of said energizer are arranged in said predetermined pattern.

14. The apparatus set for in claim 9 wherein said conveyor has at least one staging platform for carrying a single container and rotating said container thereon along its longitudinal axis in proximity of said energizer.

15. The apparatus set forth in claim 9 wherein said conveyor includes at least one of a linear conveyor, a rotary conveyor, or a serpentine conveyor.

16. The apparatus set forth in claim 9 wherein the energizer is located outside of a lehr.

17. The apparatus set forth in claim 9 wherein the energizer is adapted to provide localized heat from at least some of the energy-emitting locations to said container at a temperature within a range of 550-720° C.

18. The apparatus set forth in claim 9 wherein the energizer comprises an oxy-propane burner.

* * * * *